Nov. 2, 1937.   G. H. LEWIS   2,097,820
SEALING DEVICE FOR CONTAINERS
Filed Aug. 13, 1936
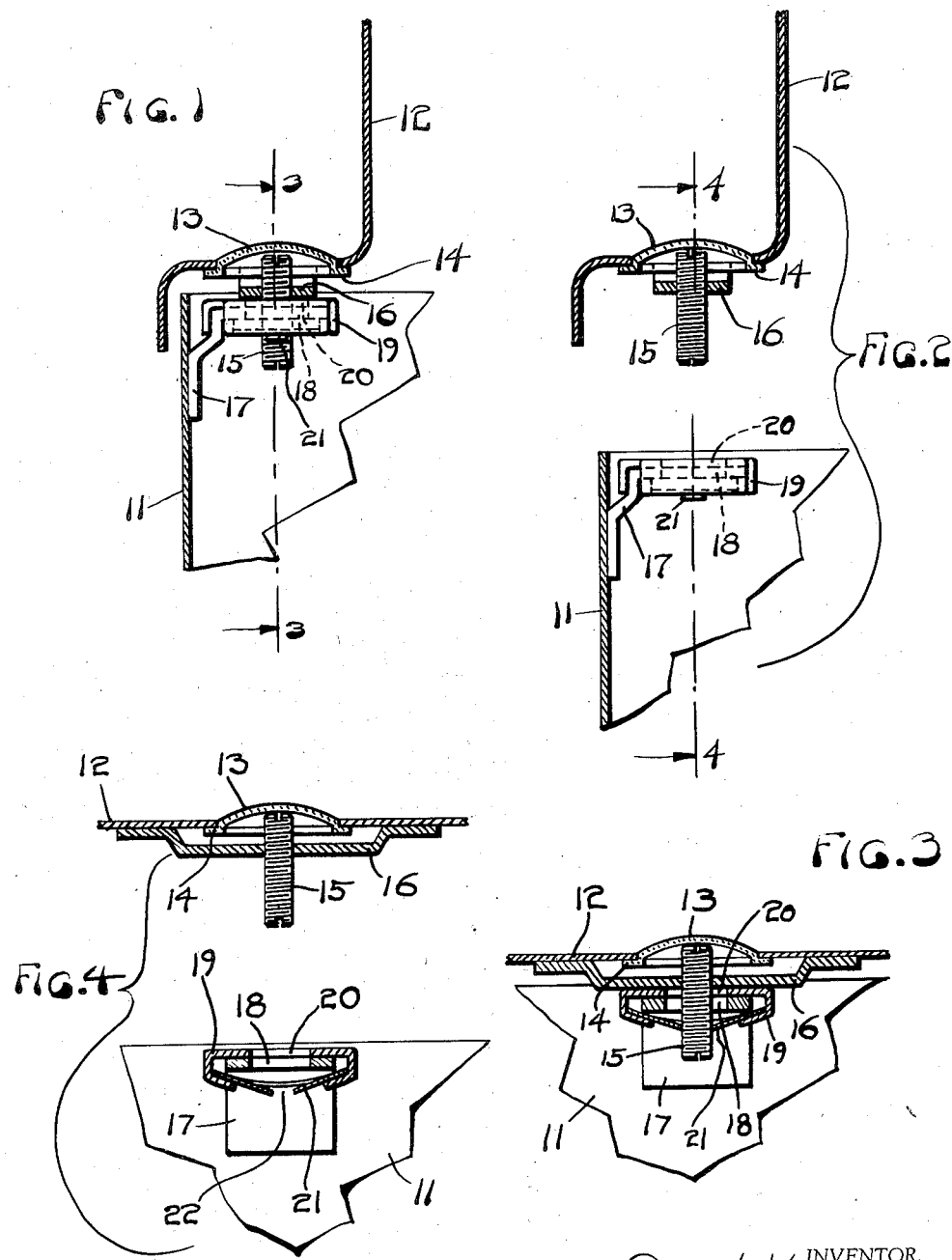
INVENTOR.
Grant H. Lewis
BY Bogert + Bogert
ATTORNEYS Patented Nov. 2, 1937

2,097,820

UNITED STATES PATENT OFFICE 2,097,820

SEALING DEVICE FOR CONTAINERS

Grant H. Lewis, Cincinnati, Ohio, assignor to The Corcoran-Brown Lamp Company, Cincinnati, Ohio, a corporation of Ohio Application August 13, 1936, Serial No. 95,877

2 Claims. (Cl. 220—27)

This invention, especially adapted and designed to be used in the sealing of two enclosure elements in assembled or closed position or condition relatively to each other, as in the bodies and lids of boxes, especially metal inclosures for containing electric and gas meters or other equipment, has for an object to produce a seal which performs its function through the employment of frangible and non-frangible elements, the latter performing the function of locking the box and securing the frangible element in position to prevent unauthorized displacement thereof as well as to facilitate renewal thereof.

A further object is to produce a sealing device which by virtue of an unique assembly of standard elements, functions to lock the box elements closed upon a mere closing movement of the lid relatively to the body and requires breakage of one of the elements as well as the manipulation of another of the elements to unlock the box lid from its closed association with the body.

A further object is to produce a sealing device for the purposes described, in which inspection as to the condition thereof may be entirely visible and without manipulation, and may be made quickly, even at a distance, provided suitable illumination thereof through the use of an inspector's flashlamp or other source is available.

A further object is to produce a sealing device of the type described, in which the frangible element employed may be so modified as to shape, size, color, and/or other characteristics as to indicate at a glance the character of the container contents and/or to indicate quickly and indisputably, the grade, class or kind of services to which the sealed container relates.

These and other objects are attained in the seal described in the following specification and illustrated in the accompanying drawing, in which:

Fig. 1 is a fragmental sectional view of container parts secured in sealed condition by a seal embodying my invention.

Fig. 2 is a view of the same parts shown in Fig. 1, but showing the container parts separated and bearing their respective portions of the seal in position such as they would occupy just previous to the closing or assembling operation.

Fig. 3 is a transverse sectional view of the assembled container and seal elements as taken and viewed upon the line 3—3 of Fig. 1, looking in the direction of the arrows.

Fig. 4 is a view of the container and seal parts in separated condition, as viewed upon the line 4—4 of Fig. 2.

No attempt has been made to show any specific type of container, but, by way of example, I have shown a body element 11 which may be closed by a lid element 12, the container being one such as might be employed for housing an electric meter. In an opening in the lid of the container I mount a glass or other breakable disc or lens 13, which has a flange 14 on its under side thereby necessitating its application to the lid opening from beneath so that it has to be pressed or otherwise held in position, as by an extension or setscrew 15 mounted as in a bracket 16 bridging the opening from beneath, as each of the views shows. Obviously, placement, replacement, and adjustment of this sealing disc is accomplished by the mere releasing movement of the screw, followed by a tightening movement thereof of sufficient tension to hold the frangible element in place. I have described the part 13 as being a disc or lens, but it is important to appreciate the fact that its exact shape may be varied as desired, or that the material of the frangible part may be other than glass.

In the body 11 a bracket 17 is mounted by welding or the like. This bracket has an opening 18 in its overhanging arm, not only so that it may receive a clip 19 which contains a registering opening 20, but also so that a snap or locking device in the form of a commercially known "speed nut" 21 may be held thereto by the clip, with its opening 22 aligned with openings 18 and 20 of the arm and clip respectively.

Because of the unique use of the speed nut employed in my seal construction, it is merely necessary to press the container lid into closed position tightly against the body, this position being shown in Figs. 1 and 3, in which the seal parts conveniently engage each other, thereby affording ventilation and air circulation if this feature be desirable, although it is obvious that mere placement of the bracket 17 a little lower on the inner face of the body wall will bring container elements 11 and 12 into actual contact, thereby eliminating the ventilation feature.

Variation in shape, size, material and/or color of the frangible cap 13 is possible for the attainment of various purposes. For example, by varying the color of this part it is possible, at a glance, to tell the kind of service being furnished, the customer to whom it is going, or other information equally important. Also, this may be given by variation in the shape of the frangible part or seal, thereby making it impossible for the different services to be confused because the seals could not be reversed. Another feature of my invention is that the frangible seals can be furnished to bear the insignia of the company furnishing the service. In addition to these thoughts it is possible that advantage may be experienced in having the rear faces of the seals of pebbled or reflecting surfaced character in order that the seals may catch and reflect the light of an inspector's flashlamp should the equipment be located in a dark basement, hallway or the like.

I call attention to the unique combination of commercially available elements in my improved sealing device. In the assembly of parts the three principal ones are the seal 13, the set screw 15, and the speed nut 21. These are all standard parts already to be had from suitable sources of supply. Obviously, it is merely desirable that the seal be provided with some special feature of distinction, as has been suggested, so that it is not possible to reproduce it readily, even in the face of its generally well known features of size and design or shape.

Having thus described my invention what I claim is:

1. A sealing device for containers having two relatively movable elements, consisting of a frangible seal occupying an opening in one of the container elements, an adjustable locking pin on said one of said container elements securing the seal in position, and a pin-grip on the other of said container elements, adapted, when the first and second mentioned elements are moved to closed position, to become locked and inaccessible as to the container interior, whereby breakage of said seal is required to reopen the container by manipulation of said pin-grip.

2. A sealing device for containers having lid and body elements, consisting of a frangible seal, an adjustable locking pin on said lid for holding the seal in place, and a pin-grip on the body engageable by the pin upon closing the body with the lid, whereby the container may be opened only by breaking the seal to facilitate releasing manipulation of the locking pin.

GRANT H. LEWIS.